(12) United States Patent
Nakagawa et al.

(10) Patent No.: US 7,513,243 B2
(45) Date of Patent: Apr. 7, 2009

(54) FUEL SUPPLY APPARATUS FOR MOTOR CYCLE

(75) Inventors: Mitsuyuki Nakagawa, Kawasaki (JP); Hidefumi Yoshida, Kawasaki (JP); Yasuhiro Koito, Kawasaki (JP)

(73) Assignee: Keihin Corporation, Tokyo (JP)

( * ) Notice: Subject to any disclaimer, the term of this patent is extended or adjusted under 35 U.S.C. 154(b) by 75 days.

(21) Appl. No.: 11/715,423

(22) Filed: Mar. 8, 2007

(65) Prior Publication Data

US 2007/0215122 A1 Sep. 20, 2007

(30) Foreign Application Priority Data

Mar. 17, 2006 (JP) .............................. 2006-074451

(51) Int. Cl.
*F02M 37/04* (2006.01)
(52) U.S. Cl. ....................................... 123/509; 123/510
(58) Field of Classification Search ................. 123/509, 123/510–511; 220/835
See application file for complete search history.

(56) References Cited

U.S. PATENT DOCUMENTS

| | | | | |
|---|---|---|---|---|
| 4,853,123 A | * | 8/1989 | Hayes et al. ................. | 210/316 |
| 4,919,103 A | * | 4/1990 | Ishiguro et al. .............. | 123/514 |
| 5,415,146 A | * | 5/1995 | Tuckey ........................ | 123/509 |
| 5,511,957 A | * | 4/1996 | Tuckey et al. ................ | 417/313 |
| 5,560,342 A | * | 10/1996 | Fournier et al. ............. | 123/509 |
| 5,647,328 A | * | 7/1997 | Fournier et al. ............. | 123/509 |
| 5,875,816 A | * | 3/1999 | Frank et al. .................. | 137/549 |
| 5,908,020 A | * | 6/1999 | Boutwell et al. ............. | 123/541 |
| 5,988,213 A | * | 11/1999 | Yoshioka ..................... | 137/590 |
| 6,029,633 A | * | 2/2000 | Brandt ......................... | 123/509 |
| 6,065,452 A | * | 5/2000 | Yoshioka ..................... | 123/509 |
| 6,123,521 A | * | 9/2000 | Mori et al. ................... | 417/423.3 |
| 6,155,238 A | * | 12/2000 | Briggs et al. ................. | 123/509 |
| 6,156,201 A | * | 12/2000 | Ueda et al. ............... | 210/416.4 |
| 6,158,975 A | * | 12/2000 | Dill et al. ..................... | 417/307 |
| 6,164,267 A | * | 12/2000 | Okada et al. ................. | 123/510 |
| 6,196,200 B1 | * | 3/2001 | Roche ......................... | 123/509 |
| 6,206,037 B1 | * | 3/2001 | Murakoshi et al. ..... | 137/565.34 |
| 6,253,790 B1 | * | 7/2001 | Hara ...................... | 137/565.17 |
| 6,260,543 B1 | * | 7/2001 | Chih ........................... | 123/509 |
| 6,308,691 B1 | * | 10/2001 | Frank et al. .................. | 123/509 |
| 6,382,190 B1 | * | 5/2002 | Tanabe et al. ................ | 123/509 |

(Continued)

FOREIGN PATENT DOCUMENTS

JP 11-093794 * 4/1999

*Primary Examiner*—Thomas N Moulis
(74) *Attorney, Agent, or Firm*—Bacon & Thomas, PLLC (57) ABSTRACT

A fuel supply apparatus for a motor cycle allows the motor cycle to execute rapid jump traveling and accelerated drive just after the jump traveling. A fuel pump (P) and a fuel filter (F) connected to a pump suction path (Pa) of the fuel pump (P) are attached to a lid member (1) closing an opening portion (Ta) of a fuel tank (T). The fuel pump (P) provided with the fuel filter (F) is arranged so as to be inserted into the fuel tank (T) via the opening portion (Ta). The fuel filter (F) is arranged within a filter storage case (C) surrounding an entire outer periphery of the fuel filter (F) in an approximately sealed manner. A fuel supply hole (25) open to an inner side of the fuel tank (T) is pierced in a side wall (Cb1) along a gravity force direction (X) of the filter storage case (C).

3 Claims, 3 Drawing Sheets

U.S. PATENT DOCUMENTS

| | | | |
|---|---|---|---|
| 6,401,750 B2 * | 6/2002 | Tokunaga | 137/565.34 |
| 6,436,287 B1 * | 8/2002 | Fischerkeller et al. | 210/232 |
| 6,439,205 B2 * | 8/2002 | Ushigome | 123/509 |
| 6,655,364 B1 * | 12/2003 | Yoshioka | 123/509 |
| 6,655,365 B2 * | 12/2003 | Beyer et al. | 123/509 |
| 6,907,865 B1 * | 6/2005 | Hanby | 123/509 |
| 6,966,306 B2 * | 11/2005 | Sawert et al. | 123/509 |
| 7,029,582 B2 * | 4/2006 | Sato et al. | 210/232 |
| 7,150,269 B2 * | 12/2006 | de Monts de Savasse et al. | 123/510 |
| 7,275,523 B2 * | 10/2007 | Kimura et al. | 123/509 |
| 2004/0112819 A1 * | 6/2004 | Ebihara et al. | 210/232 |
| 2005/0126546 A1 * | 6/2005 | Yagisawa | 123/509 |
| 2005/0173918 A1 * | 8/2005 | Eguchi et al. | 280/834 |
| 2005/0201877 A1 * | 9/2005 | Mitsudou | 417/423.14 |
| 2007/0113832 A1 * | 5/2007 | Kimura et al. | 123/520 |
| 2007/0199884 A1 * | 8/2007 | Nakagawa | 210/416.4 |

\* cited by examiner

FUEL SUPPLY APPARATUS FOR MOTOR CYCLE

BACKGROUND OF THE INVENTION

1. Field of the Invention

The present invention relates to an in-tank type fuel supply apparatus in which a fuel within a fuel tank is boosted by a fuel pump arranged within the fuel tank and the boosted fuel is supplied toward a fuel injection valve, and more particularly to a fuel supply apparatus for a motor vehicle arranged within a fuel tank of the motor cycle.

2. Description of the Conventional Art

A conventional fuel supply apparatus for a motor cycle is shown in Japanese Unexamined Patent Publication No. 11-93794. In accordance with this publication, an opening portion is pierced in a bottom portion of a fuel tank, and the opening portion is closed by a lid member.

Further, a fuel pump is attached to a stay provided in a rising manner in the lid member by being fastened by a band. A fuel filter is connected to a pump suction path protruding from a lower side of the fuel pump, and a pump discharge path protruding from an upper side of the fuel pump is provided in a rising manner in the lid member, and is connected to a fuel discharge pipe open to an outer side of the fuel tank by a fuel piping.

Accordingly, the fuel pump provided with the fuel filter is arranged so as to be inserted into the fuel tank from the opening portion of the fuel tank, and the opening portion is closed by the lid member, whereby the in-tank type fuel supply apparatus is formed. In this case, if the fuel pump is driven, a foreign material contained in the fuel within the fuel tank is removed by the fuel filter, a clean fuel is sucked into the fuel pump via the pump suction path, and the fuel boosted by the fuel pump is supplied toward the fuel injection valve existing in an outer side of the fuel tank from the fuel discharge pipe.

Patent Document 1: Japanese Unexamined Patent Publication No. 11-93794

In accordance with the conventional fuel supply apparatus for the motor cycle mentioned above, the fuel filter connected to the pump suction path of the fuel pump is arranged near a bottom portion of the fuel tank.

This is executed for making a dead remaining amount (corresponding to an amount of the fuel within the fuel tank at which the fuel pump can not suck) of the fuel as small as possible by effectively using the fuel reserved within the fuel tank.

On the other hand, the motor cycle frequently executes an off-road traveling on a rough road having a violent undulating, a jump traveling and the like in comparison with a four-wheeled vehicle. For example, in a motor cycle for a motocross, at a time of an accelerated drive just after a rapid jump traveling, there is a case that a breathing is generated in a rotation ascent of an engine. This is because of the following reason. If the rapid jump traveling is executed in a state in which the fuel within the fuel tank is consumed and a large space exists in an upper portion of a liquid level of the fuel within the fuel tank, the fuel within the fuel tank is moved to the upper space on the basis of its inertia, a periphery of the fuel filter arranged in the bottom portion of the fuel tank is temporarily under an empty state, and the supply of the fuel moving toward the fuel injection valve from the fuel pump is intermittently executed at least temporarily.

There is a tendency that the phenomenon mentioned above appears remarkably in accordance with a reduction of the remaining amount of the fuel within the fuel tank, and this is considered to be caused by a violent upward movement of the fuel within the fuel tank.

A fuel supply apparatus in accordance with the present invention is made by taking the problem mentioned above into consideration, and an object of the present invention is to provide a fuel supply apparatus for a motor cycle which can always supply a stable fuel continuously toward a fuel injection valve from a fuel pump even at a time of a rapid jump and an accelerated drive just after the jump traveling, and can always obtain an improved driving performance, and which is particularly preferably employed for a motor cycle.

SUMMARY OF THE INVENTION

In order to achieve the object mentioned above, in accordance with a first aspect of the present invention, there is provided a fuel supply apparatus for a motor cycle in which a fuel pump is attached to a lid member closing an opening portion pierced in a fuel tank, the fuel pump and a fuel filter connected to a pump suction path of the fuel pump are arranged so as to be inserted into the fuel tank via the opening portion, and a pump discharge path of the fuel pump is open to an outer side of the fuel tank via a fuel discharge pipe provided in a rising manner in the lid member, wherein the fuel filter arranged within the fuel tank is arranged within a filter storage case arranged within the fuel tank and surrounding an entire outer periphery of the fuel filter in an approximately sealed manner, and a fuel supply hole supplying the fuel within the fuel tank to an inner side of the filter storage case is provided in a protruding manner in a side wall along a gravity force direction of the filter storage case.

Further, in accordance with a second aspect of the present invention, there is provided a fuel supply apparatus having a fuel pump protruding into a fuel tank, the fuel pump being attached to a lid member closing an opening portion at a bottom portion of the fuel tank, wherein the fuel pump has a longitudinal axial line extending in a vertical manner, a fuel filter connected to a pump suction path of the fuel pump and arranged to be inserted into the fuel tank via said opening portion, wherein the fuel filter extends along the longitudinal axial line of the fuel pump and faces an outer periphery of the fuel pump, a pump discharge path of the fuel pump in communication with an outer side of the fuel tank via a fuel discharge pipe, a guide tube portion extending upwardly in a rising manner from an upper surface of the lid member, wherein the lid member is in contact with the bottom portion of the fuel tank, a fuel piping having a first end connected to the pump discharge path and a second end connected to the fuel discharge pipe, wherein the fuel piping extends along the longitudinal axial line of the fuel pump and along an outer periphery of the fuel pump, a closed-end cup-shaped filter storage case surrounding an outer periphery of the fuel piping, the fuel pump, and the fuel filter, wherein the filter storage case extends along the longitudinal axial line of the fuel pump and is arranged to be fitted connectedly to an outer periphery of the guide tube portion, and a fuel supply hole extending through and formed by a side wall of the filter storage case for supplying the fuel within the fuel tank to an inner side of the filter storage case, wherein the fuel pump, the pump suction path, the pump discharge path, the fuel filter, and the fuel Piping are arranged on an inner side of the guide tube portion.

Further, in accordance with a third aspect of the present invention, in addition to the features of the first aspect and the second aspect, a pressure regulator is connected to the fuel piping communicating the pump discharge path and the fuel discharge pipe, and a return fuel piping connected to a fuel discharge path of the pressure regulator is open to the inner side of the filter storage case.

Further, in accordance with a fourth aspect of the present invention, in addition to the feature of the second aspect, a return fuel piping is inserted to the inner side of the filter storage case from an upper bottom portion of the filter storage case.

In accordance with the first aspect of the present invention, the fuel filter connected to the pump suction path of the fuel pump is arranged within the fuel tank, and the fuel filter is arranged within the filter storage case existing within the fuel tank and formed in the approximately sealed shape. Further, the fuel supply hole is provided in the side wall along the gravity force direction of the filter storage case.

In accordance with the structure mentioned above, the fuel within the fuel tank is supplied to the inner side of the filter storage case from the fuel supply hole, and the fuel within the filter storage case is supplied to the inner side of the fuel pump from the pump suction path while the foreign material thereof being removed by the fuel filter.

The fuel pump boosts the fuel by the pump portion, and the boosted fuel is supplied to the fuel injection valve arranged in the outer portion via the pump discharge path, the fuel piping and the fuel discharge pipe.

In this case, if the motor cycle rapidly executes the jump traveling toward the upper side at a time of the vehicle drive, the fuel existing in the bottom portion within the fuel tank is moved to the upper space on the basis of its inertia force, and there is instantaneously generated a state in which the fuel does not exist in the bottom portion of the fuel tank.

However, in accordance with the present invention, since the fuel filter is arranged within the filter storage case formed in the approximately sealed shape and the fuel supply hole is pierced in the side wall along the gravity force direction of the filter storage case, the fuel within the filter storage case flows out to the inner side of the fuel tank in an extremely small possibility even at a time of the jump traveling mentioned above, and it is possible to stably reserve and hold the fuel with in the filter storage case, whereby it is possible to arrange the fuel filter within the filter storage case in which the fuel is sufficiently reserved.

In accordance with the structure mentioned above, the fuel pump can continuously suck the fuel reserved within the filter storage case into the fuel pump from the fuel filter, whereby it is possible to continuously execute the stable fuel supply without intermittently supplying the fuel toward the fuel injection valve at a time of the jump traveling and the accelerating drive just after the jump traveling. Accordingly, it is possible to execute an improved accelerating drive at a time of the jump traveling and just after the jump traveling.

Further, since the filter storage case can employ any shape as far as it surrounds the entire outer periphery of the fuel filter in the approximately sealed manner, the shape thereof can be approximately freely set.

Further, since the fuel filter is arranged within the filter storage case, it is possible to securely protect the fuel filter, and the fuel filter is not damaged. Further, the foreign material floating within the fuel tank does not directly come down to the fuel filter so as to be accumulated at a time when the engine stops.

Further, in accordance with the second aspect of the present invention, the closed-end cup-shaped filter storage case is arranged so as to be inserted to the outer periphery of the guide tube portion provided in the rising manner in the lid member, and the fuel pump, the fuel filter and the fuel piping arranged in the inner periphery of the guide tube portion are arranged within the filter storage case in the approximately sealed manner. Further, the fuel supply hole open to the inner side of the fuel tank is pierced in the side wall along the gravity force direction of the filter storage case.

Accordingly, the fuel within the fuel tank flows into the filter storage case via the fuel supply hole, the fuel within the filter storage case is sucked by the fuel pump via the fuel filter, and the fuel boosted by the fuel pump is supplied toward the fuel injection valve in the outer portion via the pump discharge path, the fuel piping and the fuel discharge pipe.

In accordance with the structure mentioned above, in addition to the effect of the first aspect mentioned above, since the fuel pump, the fuel filter and the fuel piping are arranged in the inner side of the filter storage case, the fuel pump, the fuel filter and the fuel piping are protected by the filter storage case at a time when the fuel supply apparatus is in a single unit, and are not damaged.

Further, since the fuel pump, the fuel filter and the fuel piping are not brought into contact with the opening portion at a time of inserting the fuel supply apparatus into the fuel tank from the opening portion of the fuel tank, the damage thereof is suppressed, and it is possible to largely improve an inserting workability.

Further, since the fuel pump is arranged within the filter storage case, it is possible to shut off a working noise of the fuel pump, a discharge noise of the fuel and the like by the filter storage case, and it is possible to effectively suppress a leakage to the outer side of the fuel tank.

Further, in accordance with the third aspect of the present invention, since the return fuel piping connected to the fuel discharge path of the pressure regulator is open to the inner side of the filter storage case, an excess fuel of the pressure regulator can be returned to the inner side of the filter storage case by the return fuel piping. Accordingly, the fuel with in the fuel tank is supplied into the filter storage case via the fuel supply hole, and the excess fuel of the pressure regulator is supplied by the return fuel piping. In accordance with the structure mentioned above, a sufficient fuel is supplied into the filter storage chamber, whereby it is possible to set the fuel supply hole to a small opening. In accordance with the fuel supply hole constituted by the small opening, it is possible to further suppress the fuel outflow to the inner side of the fuel tank from the fuel supply hole at time of the jump traveling of the motor cycle.

In accordance with the fourth aspect of the present invention, the return fuel piping is inserted into the filter storage chamber from the upper bottom portion of the filter storage case so as to be opened.

In accordance with the structure mentioned above, since the fuel pump including the return fuel piping, the fuel filter and the fuel piping are arranged in the inner side of the filter storage case, they are not damaged at a time when the fuel supply apparatus is in a single unit. Further, at a time of inserting the fuel supply apparatus into the fuel tank via the opening portion of the fuel tank, it is possible to further improve the inserting workability and the return fuel piping is not thrown around within the fuel tank.

DESCRIPTION OF THE PREFERRED EMBODIMENT

A description will be given below of an embodiment of a fuel supply apparatus for a motor cycle in accordance with the present invention with reference to the accompanying drawings.

Figure 1:
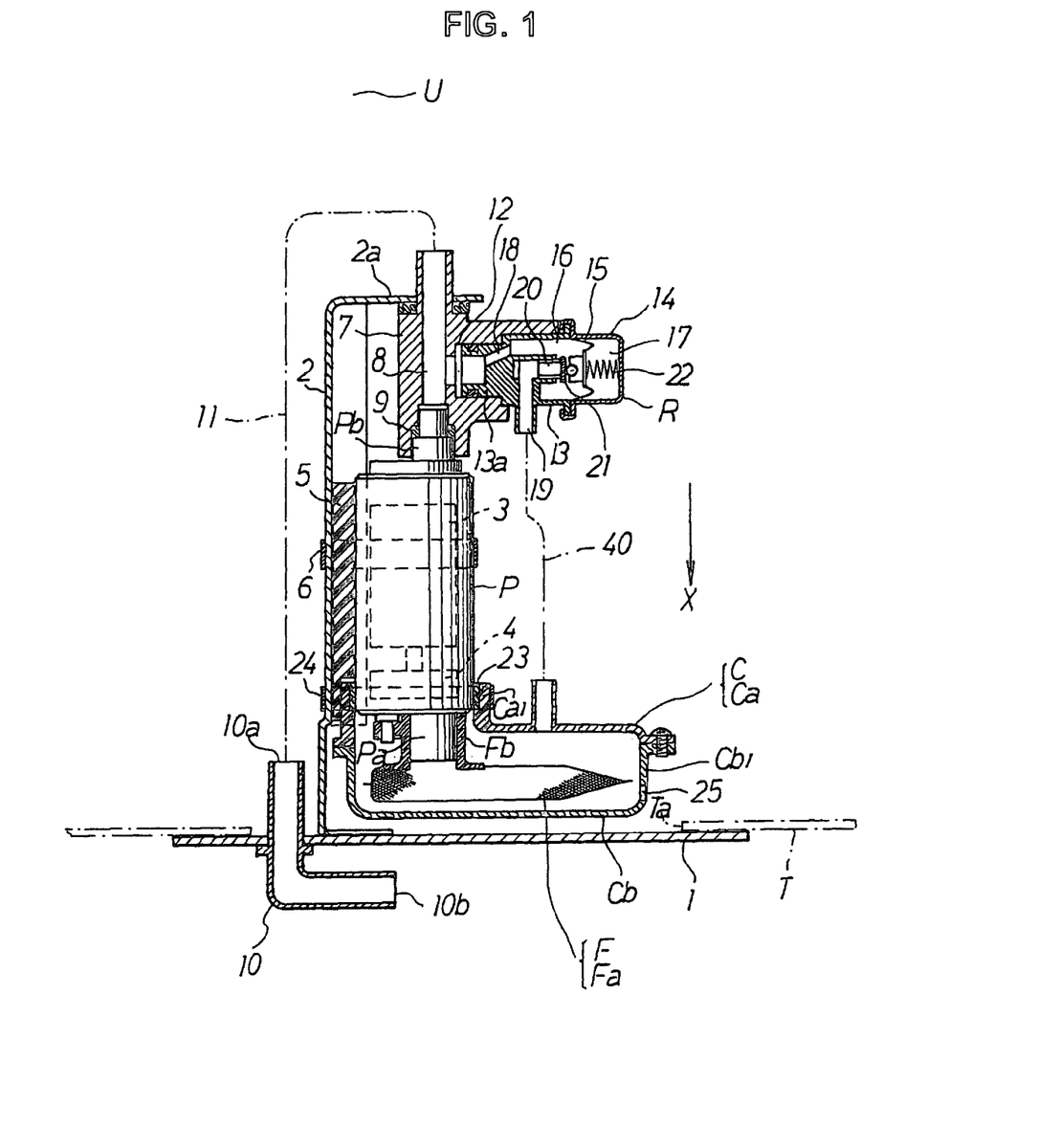
FIG. 1 is a vertical cross sectional view showing an embodiment of a fuel supply apparatus for a motor cycle in accordance with the present invention.

FIG. 1 is a vertical cross sectional view of a main portion showing an embodiment of a fuel supply apparatus for a motor cycle in accordance with the present invention. Reference symbol T denotes a fuel tank in which a fuel is reserved. An opening portion Ta is pierced in a bottom portion of the fuel tank T so as to be opened.

Reference numeral 1 denotes a lid member closing the opening portion Ta of the fuel tank T. A stay 2 formed by a plate member toward an upper side in the drawing from an upper surface of the lid member 1 and having a bent portion 2a formed in an upper portion thereof are firmly fixed to the lid member 1 in accordance with a brazing or the like.

Reference symbol P denotes a fuel pump in which a pump discharge path Pa is arranged so as to protrude from a lower end thereof, and a pump suction path Pb is arranged in an upper end thereof so as to protrude. A pump portion 4 rotationally driven by a motor 3 is arranged within the fuel pump P. If the pump portion 4 is rotated by the motor 3, the fuel is sucked into the pump portion 4 from the pump suction path Pa, and the fuel boosted by the pump portion 4 is discharged from a pump discharge path Pb.

The fuel pump P mentioned above is disclosed in Japanese Patent No. 2776304 or the like.

The fuel pump P is arranged so as to be brought into contact with the stay 2 via an insulator 5 formed by a rubber material, and is arranged so as to be fixed to the stay 2 by a fastening band 6 in a state mentioned above.

Reference numeral 7 denotes a pump holder arranged so as to be pinched between the bent portion 2a of the stay 2 and an upper end of the fuel pump P. A discharge flow path 8 is pierced in a penetrating manner in the pump holder 7 toward a vertical direction, the pump discharge path Pb of the fuel pump P is arranged so as to be inserted into a lower end opening of the discharge flow path 8 via a seal ring 9 in a liquid tight manner, and an upper end opening of the discharge flow path 8 is provided in a rising manner in the lid member 1, and is communicated with an upper end 10a of a fuel discharge pipe 10 in which the upper end 10a thereof is open toward an upper side of the lid member 1, and a lower end 10b thereof is open toward a lower side of the lid member 1, by a fuel piping 11. Further, a pressure regulator insertion hole 12 is pierced so as to be open toward a side portion from an intermediate portion of the discharge flow path 8, and a pressure regulator R is inserted into the pressure regulator insertion hole 12 so as to be fixedly arranged.

The pressure regulator R is structured such that a diaphragm 15 is pinched between a collar portion of a regulator main body 13 open to a right side in the drawing and a collar portion of a cup body 14 open to a left side in the drawing, a fuel chamber 16 is formed by an opening of the regulator main body 13 and a left side surface of the diaphragm 15, and a spring chamber 17 is sectioned and formed by an opening of the cup body 14 and a right side surface of the diaphragm 15.

Further, within the fuel chamber 16, a fuel inflow path 18 is open toward a left end of a tube portion 13a of the regulator main body 13 and a fuel discharge path 19 is open toward a side portion of the regulator main body 13.

In this case, a valve seat 20 is arranged in an open end of the fuel discharge path to the fuel chamber 16, and the fuel discharge 19 is open to an inner side of the fuel chamber 16 by the valve seat 20.

Further, a valve body 21 opening and closing the valve seat 20 is integrally attached to the diaphragm 15, and the diaphragm 15 including the valve body 21 is energized to the fuel chamber 16 side by a diaphragm spring 22 provided in a compressed manner within the spring chamber 17.

Further, the tube portion 13a of the pressure regulator is inserted in a liquid tight manner into the pressure regulator insertion hole 12 of the pump holder 7 so as to be attached to the pump holder 7.

Further, a fuel filter F provided with a filtration member Fa such as a net, a filter paper, a sponge or the like is installed to the pump suction path Pa of the fuel pump P. Specifically, a base portion Fb of the fuel filter F is inserted to an outer periphery of the pump suction path Pa, and a collar portion extending to a side direction from the base portion Fb is locked to a lower protruding portion of the fuel pump P by a clip or the like.

Further, a filter storage case C surrounding an entire outer periphery of the fuel filter F in an approximately sealed manner is arranged in an outer periphery of the fuel filter F.

A description will be more specifically given of the filter storage case C. The filter storage case C is formed in a box shape in a state in which a closed-end cup-shaped upper case Ca and a closed-end cup-shaped lower case Cb are arranged so as to be brought into contact with each other by a collar portion, a cylinder portion Ca1 formed in the upper case Ca is inserted to a lower outer periphery of the fuel pump P via an annular packing 23, and the cylinder portion Ca1 is attached to a lower outer periphery of the fuel pump P by a fastening band 24 in this state.

Further, a fuel supply hole 25 is pierced in a side wall along a gravity force direction X of the filter storage case C. Specifically, the fuel supply hole 25 is pierced in a side wall Cb1 along the gravity force direction X of the lower case Cb.

In accordance with the structure mentioned above, the fuel filter F is arranged within the filter storage case C in which the fuel supply hole 25 is pierced in an opening manner in the side wall Cb1 in the gravity force direction, and the fuel filter F is arranged so as to be stored in an approximately sealed manner within the filter storage case C.

A fuel supply apparatus U is formed in accordance with the manner mentioned above. Arranging again the fuel supply apparatus U, the fuel pump P is attached to the stay 2 provided in a rising manner in the lid member 1, the fuel filter F in which the entire outer periphery thereof is surrounded by the approximately sealed filter storage case C is arranged in the pump suction path Pa, and the discharge flow path 8 pierced in the pump holder 7 is connected to the pump discharge path Pb. Further, the discharge flow path 8 is connected to the fuel discharge pipe 10 provided in the rising manner in the lid member 1, and the pressure regulator R is arranged so as to be inserted to the pressure regulator insertion hole 12 branched from the discharge flow path 8.

Further, from the opening portion Ta of the fuel tank T, there are inserted the fuel pump P attached to the stay 2 of the fuel supply apparatus, the filter storage case C storing the fuel filter F, the pressure regulator R, the discharge flow path 8, and the upper end 10a of the fuel discharge path 10 including the fuel piping 11. In the state mentioned above, the lid member 1 closes and holds the opening portion Ta of the fuel tank T. In accordance with the structure mentioned above, the opening portion Ta of the fuel tank T is closed by the lid member 1, and within the fuel tank T, there are arranged the filter storage case C provided with the fuel filter F constructing the fuel supply apparatus U, the fuel pump P, the discharge flow path 8, the fuel piping 11, the upper end 10a of the fuel discharge pipe 10, and the pressure regulator R. On the other hand, the lower end 10b of the fuel discharge pipe 10 is open toward the outer side so as to be directed to the outer side of the fuel tank T from the lid member 1.

In this case, the opening portion Ta of the fuel tank T in the present embodiment is pierced in the lower bottom portion in the gravity force direction of the fuel tank T. Accordingly, the filter storage case C including the fuel filter F is arranged near the lower bottom portion of the fuel tank T.

Next, a description will be given of an operation thereof.

At a time of the engine stop, the motor 3 of the fuel pump P is in a non-excited state, and the fuel supply from the fuel pump P toward the fuel discharge pipe 10 is stopped. In the state mentioned above, the fuel reserved within the fuel tank T is supplied into the filter storage case C via the fuel supply hole 25, and an inner side of the filter storage case C is always filled by the fuel continuously.

Further, a current application to the motor 3 of the fuel pump P is started at a time of driving the engine, and the pump portion P starts driving on the basis of the rotation of the motor 3.

In accordance with the drive of the pump portion P, a foreign material of the fuel filled within the filter storage case C is removed by the fuel filter F, a clean fuel is sucked into the pump portion 4 from the pump suction path Pa, and the fuel boosted by the pump portion 4 is discharged into the discharge flow path 8 of the pump holder 7 by the pump discharge path Pb.

A part of the fuel within the discharge flow path 8 is introduced into the fuel chamber 16 of the pressure regulator R via the pressure regulator insertion hole 12, and the fuel inflow path 18. Further, the valve body 21 including the diaphragm 15 is moved to the spring chamber 17 side against a spring force of the diaphragm spring 22 on the basis of the fuel pressure supplied into the fuel chamber 16 and the valve body 21 opens the valve seat 20, whereby an excess fuel is discharged into the fuel tank T via the fuel discharge path 19. Accordingly, it is possible to regulate the pressure of the fuel flowing within the discharge flow path 8 to a desired constant pressure.

Therefore, the fuel regulated to the constant pressure within the discharge flow path 8 is supplied toward the external portion via the fuel piping 11 and the fuel discharge pipe 10, and the fuel regulated to the constant pressure mentioned above is supplied to the engine from the fuel discharge pipe 10 via a fuel injection valve (not shown), whereby it is possible to maintain an improved operation of the engine.

In this case, the fuel within the fuel tank T is always supplied into the filter storage case C from the fuel supply hole 25.

Taking into consideration the case that the fuel tank T provided with the fuel supply apparatus is mounted on the motor cycle, and the motor cycle executes an off-road traveling having a violent undulating, and a jump traveling, the fuel within the fuel tank T is moved to an upper space of the fuel tank T on the basis of its inertia at a time of the jump traveling mentioned above, and there is a case that the fuel near the bottom portion of the fuel tank T becomes in an empty state.

This significantly appears in the case that the upper space within the fuel tank T is large (the remaining amount of the fuel is small).

In this case, in the fuel supply apparatus U in accordance with the present invention, since the approximately sealed filter storage case C isolated from the fuel tank T is arranged within the fuel tank T, the fuel within the filter storage case C does not flow out into the fuel tank T on the basis of its inertia force at a time of the jump traveling mentioned above, and it is possible to always fill and hold the fuel within the filter storage case C.

In this case, since the fuel supply hole 25 pierced in the filter storage case C is pierced in the side wall Cb1 along the gravity force direction X of the filter storage case C, the fuel supply hole 25 is arranged so as to be orthogonal to the gravity force direction X, and it is possible to effectively suppress the outflow of the fuel into the fuel tank T from the fuel supply hole 25 even at a time when the fuel within the filter storage case C is exposed to the inertia force in the gravity force direction.

Further, since the entire periphery of the fuel filter F is arranged within the filter storage case C in which the fuel is always filed even at a time of the jump traveling, as mentioned above, it is possible to stably and continuously supply the fuel toward the fuel pump P even at a time of the jump traveling. Accordingly, it is possible to execute the jump traveling and the accelerating drive just after the jump traveling.

In this case, it is desirable that the opening area of the fuel supply hole is as small as possible within the area capable of obtaining a maximum discharge amount of the fuel pump P without trouble.

Further, in the case that a plurality of fuel supply holes 25 are provided, it is possible to make the opening area per one smaller, and it is possible to more effectively suppress the outflow of the fuel into the fuel tank t from the inner side of the filter storage case C.

The above matter is applied to the fuel supply hole in the other embodiment mentioned below in the same manner.

Further, since the approximately entire outer periphery of the fuel filter F is surrounded by the filter storage case C, the fuel filter F can be securely protected from the danger and is not damaged. Further, when the engine stops, the foreign material floating in the fuel within the fuel tank does not directly come down on the fuel filter F so as to be accumulated, and it is possible to maintain an improved filtering performance of the fuel filter F for a long term.

Further, since the shape of the filter storage case C is not limited particularly within the shape capable of surrounding the outer periphery of the fuel filter F in the approximately sealed manner, a freedom in design of the filter storage case C is high.

Further, since the approximately sealed filter storage case C may be arranged in the outer periphery of the fuel filter F, in the conventional fuel supply apparatus, it is possible to extremely easily apply to the conventional fuel supply apparatus.

Figure 2:
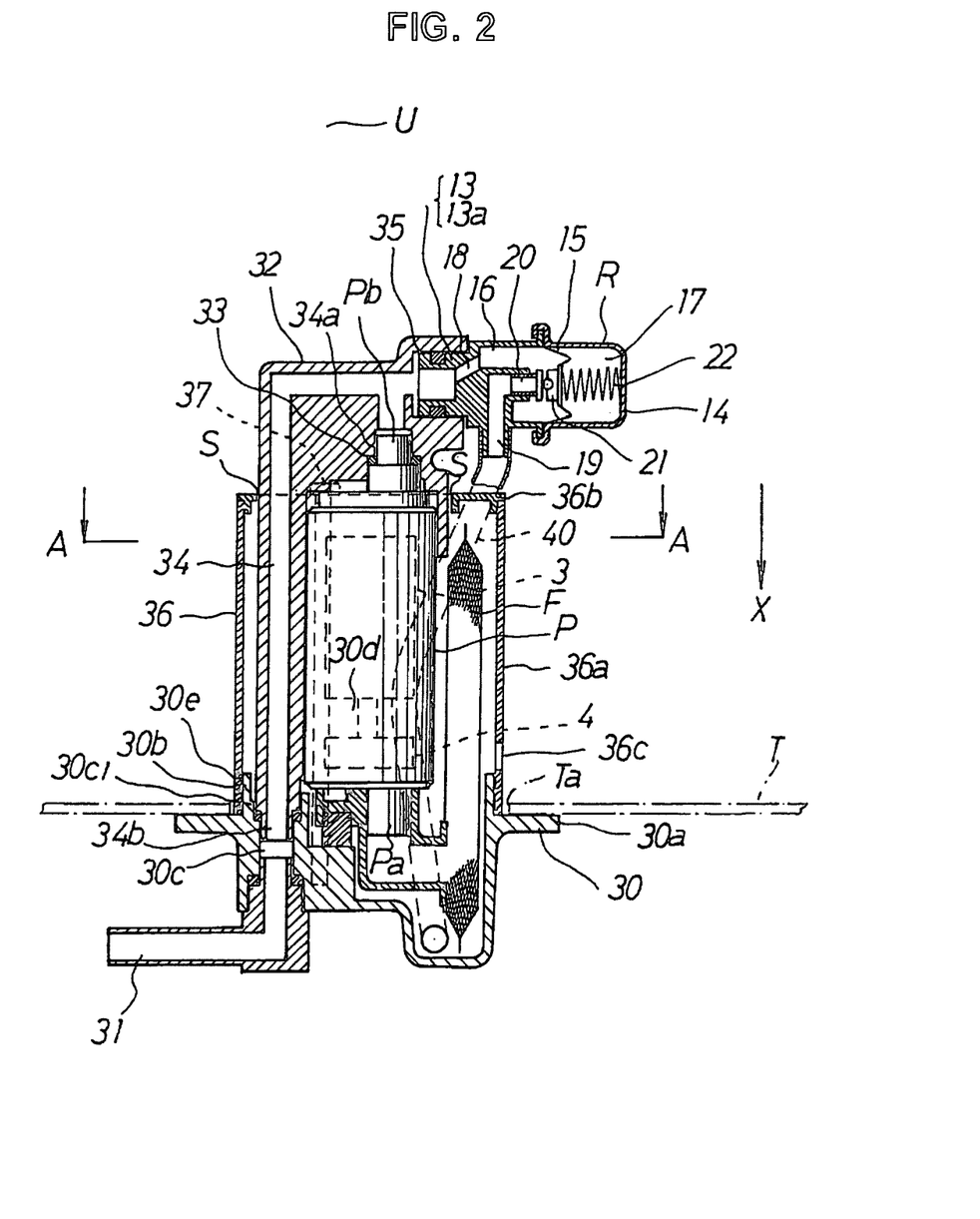
FIG. 2 is a vertical cross sectional view showing the other embodiment of the fuel supply apparatus for the motor cycle in accordance with the present invention.
Figure 3:
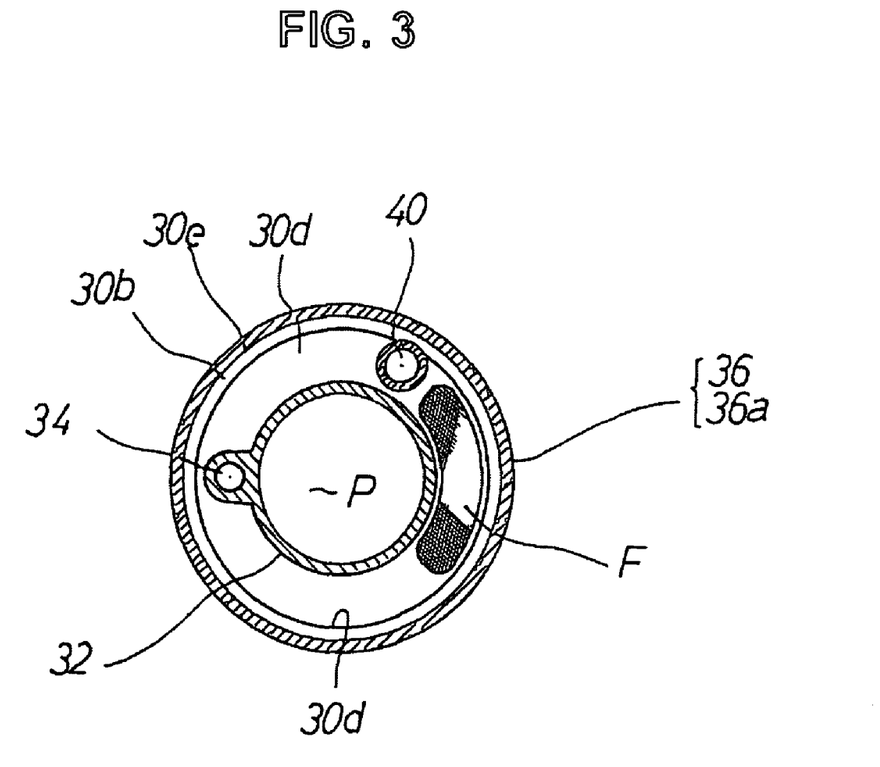
FIG. 3 is a horizontal cross sectional view of a main portion in a line A-A in FIG. 2.

Next, a description will be given of the other embodiment of the fuel supply apparatus for the motor cycle in accordance with the present invention with reference to FIGS. 2 and 3. FIG. 2 is a vertical cross sectional view of the fuel supply apparatus, and FIG. 3 is a horizontal cross sectional view in a line A-A in FIG. 2.

Reference numeral 30 denotes a lid member closing the opening portion Ta of the fuel tank T. A cylindrical guide tube portion 30b is formed in an upper surface 30a of the lid member 30 so as to protrude toward an upper side, a flow path insertion hole 30c is pierced in an inner side of the guide tube portion 30*b* so as to pass through in a vertical direction, and a fuel discharge pipe 31 open toward an outer portion is fixedly arranged in a lower opening of the flow path insertion hole 30*c* in a liquid tight manner.

Reference numeral 32 denotes a pump holder arranged in an inner side of the guide tube portion 30*b*. Within the pump holder 32, there is pierced a fuel piping 34 in which one end is inserted to the pump discharge path Pb of the fuel pump P via a seal ring 33 and the other end is inserted to an upper opening of the flow path insertion hole 30*c* of the lid member 30, and a pressure regulator insertion hole 35 is pierced in an opening manner by being branched to a side direction from the fuel piping 34.

In this case, the same pressure regulator R as the first embodiment is inserted to the pressure regulator insertion hole so as to be fixedly arranged, and the same reference symbol as FIG. 1 is used in the pressure regulator R.

Further, the same fuel pump as FIG. 1 is used in the fuel pump P provided with the pump suction path Pa and the pump discharge path Pb, and the fuel filter F is attached to the pump suction path Pa.

Further, the fuel pump P provided with the fuel filter F is pinched by the pump holder 32 and the lid member 30. Specifically, the pump discharge path Pb of the fuel pump P is inserted to an upper opening 34*a* of the fuel piping 34, a lower opening 34*b* of the fuel piping 34 is inserted to an upper opening 30*c*1 of the flow path insertion hole 30*c* of the lid member 30, and the pump holder 32 is screwed with the lid member 30 by a screw (not shown) in the state mentioned above.

Further, particularly, the fuel pump P provided with the pump suction path Pa and the pump discharge path Pb, the fuel filter F connected to the pump suction path Pa, and the fuel piping 34 pierced in the pump holder 32 and structure such that one end is connected to the pump discharge path Pb and the other end is connected to the fuel discharge pipe 31 provided in a rising manner in the lid member 30 are arranged in an inner side 30*d* of the guide tube 30*b* of the lid member 30.

Further, in an outer periphery 30*e* of the guide tube portion 30*b*, there is arranged in an inserting manner a closed-end cup-shaped filter storage case 36 surrounding an outer periphery of the fuel piping 34, the fuel pump P and the fuel filter F.

More specifically, a cylindrical side wall 36*a* along a gravity force direction X (corresponding to a vertical direction in FIG. 2) is arranged so as to be inserted to the outer periphery 30*e* of the guide tube portion 30*b*, and an upper bottom portion 36*b* formed in an upper portion of the side wall 36*a* is arranged so as to be inserted to an outer periphery of the pump holder 32 including the fuel piping 34 with a small gap S.

Further, a fuel supply hole 36*c* is pierced in the side wall 36*a* along the gravity force direction of the filter storage case 36.

The filter storage case 36 structured as mentioned above is arranged so as to be screwed toward the lid member 30 form the upper bottom portion 36*b* by a screw 37, whereby it is possible to arrange the fuel piping 34, the fuel pump P and the fuel filter F within the filter storage case 36 so as to surround in an approximately sealing manner. On the other hand, an inner side of the filter storage case 36 is open to an outer side by the fuel supply hole 36*c*.

In this case, an opening area of the fuel supply hole 36*c* corresponds to an area capable of obtaining a maximum discharge amount of the fuel pump P without trouble, and the small gap S is set to a gap capable of applying a flow path resistance to a fuel flow toward an outer side from an inner side of the filter storage case 36.

Further, the fuel supply hole 36*c* is preferably set to a range in which the opening of the fuel supply hole 36*c* is not closed by an outer periphery of the guide tube portion 30*b* at a time when the side wall 36*a* of the filter storage case 36 is inserted to the outer periphery of the guide tube portion 30*b*, and to be as lower as possible in the gravity force direction X.

Further, the fuel supply apparatus U constituted by the structure mentioned above is installed to the inner side of the fuel tank T in accordance with the following manner. In other words, the filter storage case 36 including the pressure regulator R is inserted into the fuel tank T from the opening portion Ta of the fuel tank T, and the upper surface 30*a* of the lid member 30 is brought into contact with the bottom surface of the fuel tank T and the lid member 30 is screw fixed to the fuel tank T by the screw (not shown) in the state mentioned above.

In accordance with the structure mentioned above, the fuel piping 34 arranged within the filter storage case 36, the fuel pump P, the fuel filter F and the pressure regulator R are arranged within the fuel tank T, and the fuel discharge pipe 31 is arranged so as to be open to the outer side of the fuel tank T.

Next, a description will be given of an operation thereof. The fuel within the fuel tank T is supplied into the filter storage case 36 by the fuel supply hole 36*c*, and the fuel filter F is arranged so as to be always dipped into the fuel within the filter storage case 36.

Further, since the fuel pump P is in a non-driven state at a time when the engine stops, the fuel supply is not executed from the fuel discharge pipe 31. When the engine is driven, the foreign material of the fuel within the filter storage case 36 is removed by the fuel filter F, and is sucked into the pump portion 4 from the pump suction path Pa so as to be boosted, and the boosted fuel is discharged into the fuel piping 34 from the pump discharge path Pb.

Further, the boosted fuel within the fuel piping 34 is regulated to a desired constant pressure by the pressure regulator R in the same manner as mentioned above, and the fuel is supplied to the fuel injection valve (not shown) via the fuel piping 34 and the fuel discharge pipe 31.

In accordance with the embodiment mentioned above, since it is possible to always arrange the fuel filter F within the filter storage case 36 in which the fuel is always reserved in the same manner as mentioned above, even in the jump traveling and whatever drive state just after the jump traveling, it is possible to always supply the stable fuel continuously toward the fuel pump P, and it is possible to obtain an improved drive state. Accordingly, it is possible to further achieve the following particular effects in addition to the effects of the embodiment mentioned above.

In other words, since the fuel piping 34, the fuel pump P and the fuel filter F are arranged in the inner side of the filter storage case 36, it is possible to prevent the fuel piping, the fuel pump P and the fuel filter F from being brought into contact with the opening portion Ta so as to be damaged at a time of arranging so as to insert the fuel supply apparatus U into the fuel tank T from the opening portion Ta of the fuel tank T, and it is possible to largely improve an inserting workability thereof.

Further, since the fuel piping 34, the fuel pump P and the fuel filter F are protected by the filter storage case 36 even at a time when the fuel supply apparatus U is in the single unit, it is possible to easily transfer them.

Further, since the fuel pump P is simultaneously stored and arranged within the filter storage case 36, it is possible to shut off the drive noise of the fuel pump P, and the suction and intake noise of the fuel by the filter storage case 36. Accordingly, it is possible to prevent the noise from leaking to the outer side of the fuel tank T, and this structure is particularly preferable in the motor cycle in which the passenger is positioned near the fuel tank T.

A description will be given by turning again back to FIGS. 1 and 2. If a return fuel piping 40 connected to the fuel discharge path 19 of the pressure regulator R is arranged so as to be open to the inner side of the filter storage case C or 36, the excess fuel of the pressure regulator R is always returned to the inner side of the filter storage case C or 36. Accordingly, the fuel supply into the filter storage case C or 36 is achieved by the excess fuel by the return fuel piping 40 and the fuel within the fuel tank T by the fuel supply hole 25 or 36c.

Since the two-system fuel supply into the filter storage case C or 36 is executed as mentioned above, it is possible to make the opening area of the fuel supply hole 36c in correspondence to the supply of the excess fuel, and it is possible to further suppress the fuel outflow into the fuel tank T from the fuel supply hole 36c at a time of the jump traveling.

Further, a description will be given by turning back to FIG. 2. Since the return fuel piping 40 of the pressure regulator R is inserted into the filter storage case 36 via the upper bottom portion 36b of the filter storage case 36, the return fuel piping 40 is not arranged along the side wall 36a of the filter storage case 36, so that an inserting workability can be further improved at a time of inserting the fuel supply unit U into the fuel tank T from the opening portion Ta of the fuel tank T.

In this case, the opening portion Ta of the fuel tank T in accordance with the present embodiment is pierced in the bottom portion of the fuel tank T, however, the present invention can be applied to a structure in which the opening portion is pierced in the upper portion of the fuel tank T.

What is claimed is:

1. A fuel supply apparatus for a motor cycle, comprising:

a fuel pump protruding into a fuel tank, the fuel pump being attached to a lid member closing an opening portion at a bottom portion of the fuel tank, wherein the fuel pump has a longitudinal axial line extending in a vertical manner;

a fuel filter connected to a pump suction path of the fuel pump and arranged to be inserted into the fuel tank via said opening portion, wherein the fuel filter extends along the longitudinal axial line of the fuel pump and faces an outer periphery of the fuel pump;

a pump discharge path of the fuel pump in communication with an outer side of the fuel tank via a fuel discharge pipe;

a guide tube portion extending upwardly in a rising manner from an upper surface of the lid member, wherein the lid member is in contact with the bottom portion of the fuel tank;

a fuel piping having a first end connected to the pump discharge path and a second end connected to the fuel discharge pipe, wherein the fuel piping extends along the longitudinal axial line of the fuel pump and along an outer periphery of the fuel pump;

a closed-end cup-shaped filter storage case surrounding an outer periphery of the fuel piping, the fuel pump, and the fuel filter, wherein the filter storage case extends along the longitudinal axial line of the fuel pump and is arranged to be fitted connectedly to an outer periphery of the guide tube portion; and a fuel supply hole extending through and formed by a side wall of the filter storage case for supplying the fuel within the fuel tank to an inner side of the filter storage case, wherein the fuel pump, the pump suction path, the pump discharge path, the fuel filter, and the fuel piping are arranged on an inner side of the guide tube portion.

2. A fuel supply apparatus for a motor cycle as claimed in claim 1, wherein a pressure regulator is connected to the fuel piping which communicates said pump discharge path and the fuel discharge pipe, and a return fuel piping is connected to a fuel discharge path of the pressure regulator and is open to the inner side of the filter storage case.

3. A fuel supply apparatus for a motor cycle as claimed in claim 2, wherein said return fuel piping is inserted in the inner side of the filter storage case from an upper bottom portion of the filter storage case.

* * * * *